United States Patent

Shackleton et al.

[11] Patent Number: 5,978,507
[45] Date of Patent: Nov. 2, 1999

[54] METHOD OF FORMING A TEMPLATE OF AN IMAGE OF AN OBJECT FOR USE IN THE RECOGNITION OF THE OBJECT

[75] Inventors: Mark A Shackleton; William J Welsh, both of Ipswich, United Kingdom

[73] Assignee: British Telecommunications public limited company, London, United Kingdom

[21] Appl. No.: 08/256,835

[22] PCT Filed: Jan. 28, 1993

[86] PCT No.: PCT/GB93/00179

§ 371 Date: Aug. 9, 1994

§ 102(e) Date: Aug. 9, 1994

[87] PCT Pub. No.: WO93/15475

PCT Pub. Date: Aug. 5, 1993

[30] Foreign Application Priority Data

Jan. 29, 1992 [GB] United Kingdom .................. 9201856

[51] Int. Cl.$^6$ .............. G06K 9/46; G06K 9/66; G06K 9/50; G06K 9/62

[52] U.S. Cl. .............. 382/195; 382/201; 382/203; 382/206; 382/224

[58] Field of Search ................. 382/195, 190, 382/201, 203–206, 209, 218, 221, 224

[56] References Cited

U.S. PATENT DOCUMENTS

| | | | |
|---|---|---|---|
| 3,805,238 | 4/1974 | Rothfjell | 340/146.3 |
| 4,956,870 | 9/1990 | Hara | 382/224 |
| 5,136,686 | 8/1992 | Koza | 395/13 |
| 5,164,992 | 11/1992 | Turk et al. | 382/224 |
| 5,359,526 | 10/1994 | Whittington et al. | 364/443 |

OTHER PUBLICATIONS

Fukuhara et al. International Conference on Image Processing, Pub. No. 354 IEE, Apr. 7–9, 1992 "Motion estimation for Model based image coding".

Frederic I. Parke "Parameterized models for Facial Animation" Nov. 1982 IEEE 0272–171618211100–0061.

Leslie Farkas et al. "Anthropometric Facial Proportions in Medicine" 1987.

Keith Waters "A Muscle Model for Animating Three–dimenssional Facial expression" Computer Graphics, vol. 21, Nov 4, 1987.

Stephen Platt. "Animating Facial Expression" Computer Graphics, vol. 15, No. 3, Aug. 1981.

"Model Based Image Coding", Jul. 1990. W.J. Welsh et al. BT Telecom Technology Journal, vol. 8, No. 3, Jul. 1990.

"Image Coding From Waveforms to Animation" 1989. Robert Forchheimer et al. IEEE Transactions on Acoustics, Speech & Signal Processes, vol. 37, No. 12 Dec. 1989.

"Model–based analysis synthesis image coding (MBASIC) system for a person's face" 1989. Aizawa et al. Signal Processing: Image Communication 1. 1989.

(List continued on next page.)

*Primary Examiner*—Leo Boudreau
*Assistant Examiner*—Bipin Shalwala
*Attorney, Agent, or Firm*—Nixon & Vanderhye P.C.

[57] ABSTRACT

A method of forming a template of an image of an object includes the steps of: detecting occurrences of at least one feature type within the image which meet a respective criterion; for each such occurrence, determining a feature position which is a point within the image at which the occurrence of the feature type is to be considered as being located; and constructing a structural mesh of links between the feature positions. A method is also disclosed of forming a template derived from a plurality of templates formed from respective images of different members of the class of objects and combining the templates to form a generalized template. In particular the templates are combined using a genetic algorithm. The invention provides a method of forming a template from one or more images which does not rely on a priori assumptions about the salient features of the object for which a template is to be obtained.

10 Claims, 6 Drawing Sheets

OTHER PUBLICATIONS

NEC Research and Development, No. 96, Mar. 1990, Tokyo JP, pp. 143–159, "Chapter 4. Exclusive Use Equipment".

Buhr, "Analyse Und Klassifikation von Gesichtsbildern", NTZ ARCHIV., vol. 8, No. 10, Oct. 1986, Berlin DE, pp. 245–256.

Siedlecki et al, "A Note on Genetic Algorithms for Large-Scale Feature Selection", Pattern Recognition Letters, vol. 10, No. 5, Nov. 1989, Amsterdam, NL, pp. 335–347.

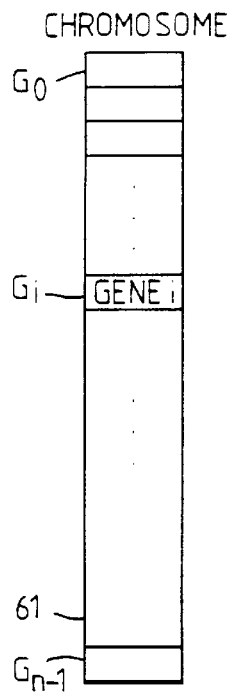
Fig.6.
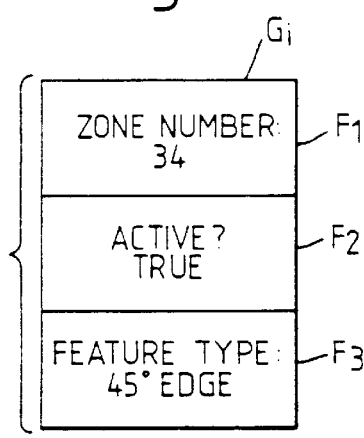
Fig.8.
Fig.7.
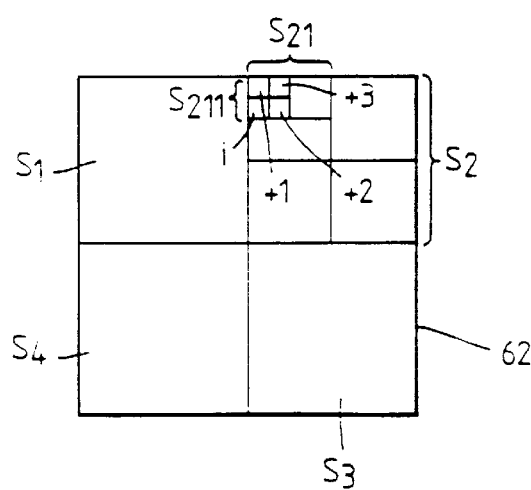
Fig.9.
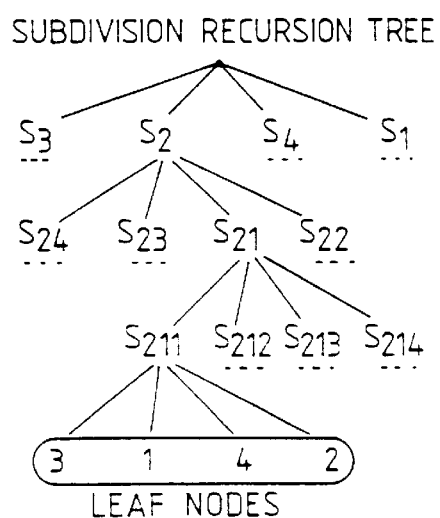
Fig.10.
SUBDIVISION RECURSION TREE

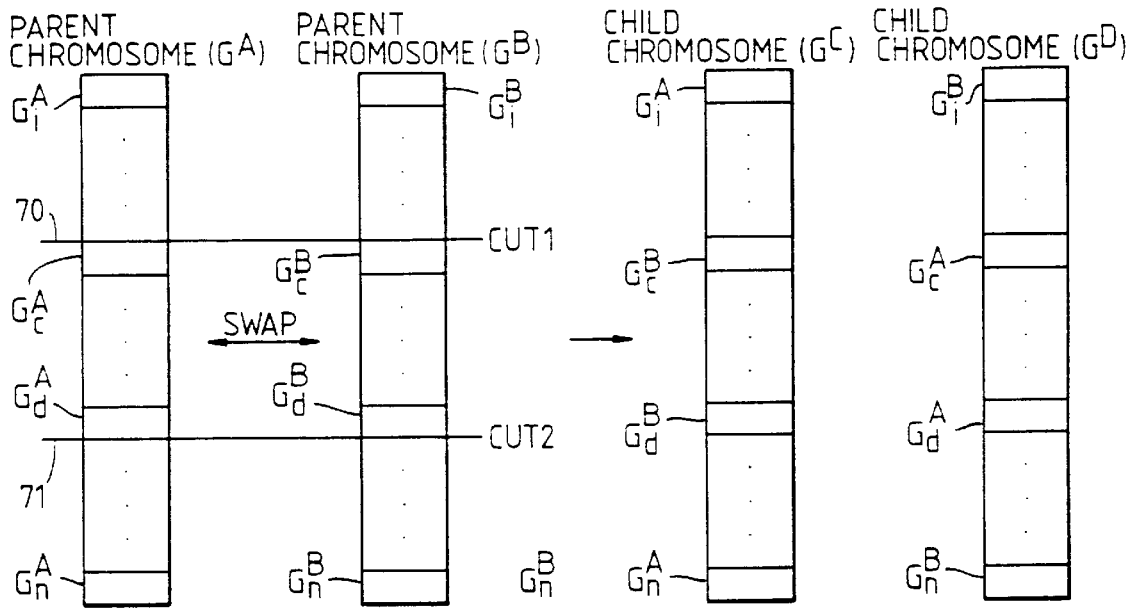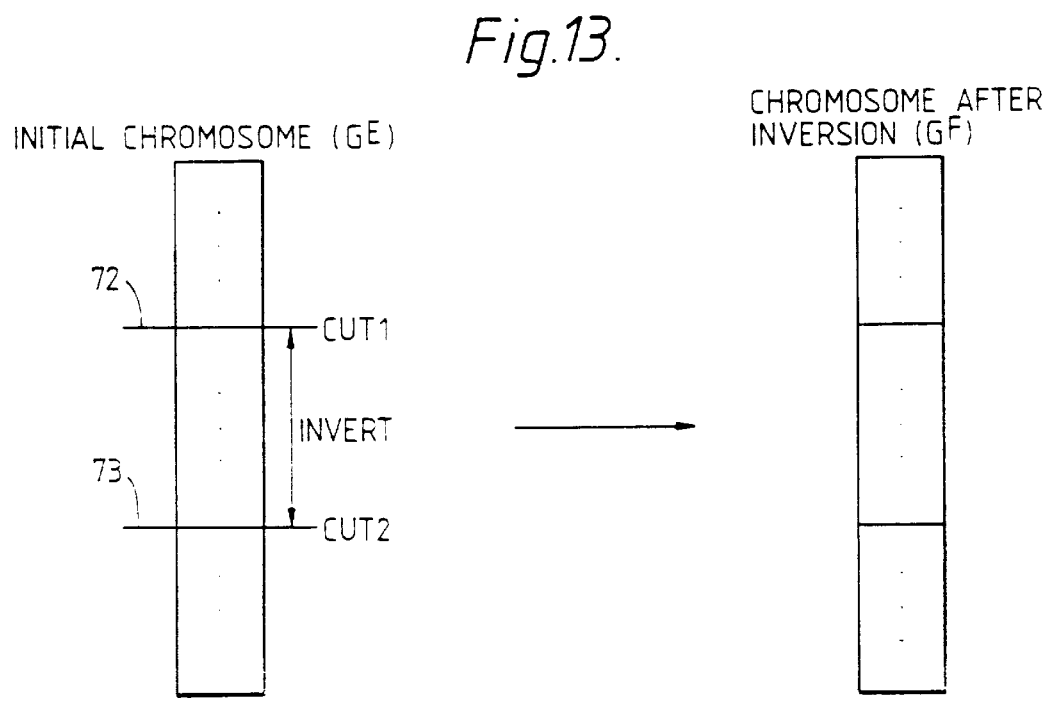

METHOD OF FORMING A TEMPLATE OF AN IMAGE OF AN OBJECT FOR USE IN THE RECOGNITION OF THE OBJECT

FIELD OF THE INVENTION

This invention relates to a method of forming a template of an image of an object, which template finds particular, but not exclusive, application to the recognition of objects in images for security and surveillance applications and in model-based image coding.

BACKGROUND OF THE INVENTION

A template is a representation of an image of an object which aims to contain the image's salient features so that the template can be subsequently compared to other images, the goodness of fit of the template to another image providing a measure of the likelihood that this image is of or contains a sub-image of the object. For example, a series of templates may be formed from respective images of the faces of a group of people. An image of a person's face captured by a security camera could then be compared to the templates to determine if that person is one of the group.

A known approach to the use of templates is described in an article entitled "Feature Extraction From Faces Using Deformable Templates" by A L Yuille, D S Cohen and P W Hallinan, Harvard Robotics Laboratory Technical Report 33-2, 1988. In this approach a feature or object of interest is described by a geometric representation which is specified by a set of parameters which incorporate knowledge of the shape of the object. The article gives examples of two such templates; one for use in recognising an eye and the other a mouth. In the former case the eye template decided upon by the authors incorporated a circle corresponding to the outer boundary of the iris, boundary coutours corresponding to the top and bottom of the eye comprising two parabolas, regions corresponding to the whites of the eyes, and two points corresponding to the centres of the whites of the eyes.

The template of Yuille et al is deformable in that the components of the template can move subject to notional structural, restraining forces between the components. When the template is matched to a test image, the components of the template are attracted to various valleys, edge and peak components of the image which attractive forces are generally resisted by the structural forces between the components of the template. An energy function is defined in terms of the attraction of the template components to the features of the image and the structural forces resisting deformation of the template, the template being deformed to minimise this energy function. This energy function gives a measure of the goodness of fit of the template to the image and can be used as a measure of whether the template has, in fact, been successfully matched to the image, ie that the image does indeed correspond to the template.

This approach to the forming of templates was devised so that a priori information available about the appearance of the features of the object to which the template was to be matched, in Yuille et al's particular case facial features, could be incorporated into the template so providing a mechanism for detecting edges or other features which comprise local information as global structures.

BRIEF DESCRIPTION OF THE INVENTION

The Applicant has appreciated that there are, however, disadvantages associated with this approach to forming a template. Firstly, because the template design is based on a priori information, it is important that the information incorporated into the template is accurate. For example, a simplification of an edge so that it can be mirrored in the template as a single geometric line may in fact hinder matching of the template to an image. It has been found, for example, that the edge of the lower eyelid can vary considerably between the populations of different countries so that a template designed to recognise a typically "Western" eye fairs badly when it is attempted to fit the template to a typically "Eastern" eye.

It is also a characteristic of such a known template that it will, in some cases, not describe accurately the feature in an image but rather what the human perceives to be the salient features of the object in the image. A further disadvantage is that these templates have to be designed "by hand" and individually coded which is time consuming and may be carried out inaccurately.

DESCRIPTION OF PREFERRED EMBODIMENTS

According to the present invention a method of forming a template of an image of an object includes the steps of:

a) detecting occurrences of at least one feature type within the image which meet a respective criterion;

b) for each such occurrence determining a feature position which is a point within the image at which the occurrence of the feature type is to be considered as being located; and c) constructing a structural mesh of links between the feature positions.

The method of the present invention processes an image to form a template appropriate to a particular object (for example an eye or a face) directly from a training image of the object. The advantage of this method is that the template encodes the significant attributes of the object which are present in the image and does not attempt to encode possibly illusory details. Furthermore, the method can be carried out without any human input into the design of the template and can potentially be applied to any object presented in a training image. Once formed the template can be used in the manner of known deformable templates for use in image recognition and other applications.

The template is derived, in the method of the invention, directly from the training image with no guidance from a human operator and without prior knowledge of what the image represents being necessary by processing a training image.

In order to provide the method of the present invention with a reasonable opportunity of deriving a suitable template from an image, the object is preferably centred within the image, and is separated from other features, that is, only the object for which a template is sought should be present in the image. The conditions may be relaxed when the template is subsequently used for matching to a test image.

The nodes of the structural mesh of links between the feature positions can be considered as linked tokens in which each token consists of a feature type, possibly attribute values such as the strength and the extent of the feature type, and its position. The template formed by the method of the present invention can be considered as being constructed of a network of such primitive tokens that have been extracted from the training image by appropriate image processing operations.

The method of the present invention is selective as to which occurrences of a feature type are included in the template. For example, it is preferable that only feature types having sufficient strength in the image are considered as these are more likely to be salient image attributes so the criterion can be set to discard all but the desired feature types detected.

In general, a feature type will extend over a portion of the image. In the template of the present invention, the feature type is considered to be located at a point within the image, so that it can form a node of the structural mesh of the template. Thus, for an occurrence of a feature type meeting the required criterion a point has to be determined which is to be that point where the feature is deemed to be located. This could, for example, be the centroid of the feature type.

The structural mesh of links between the feature positions will incorporate structural forces between the nodes of the mesh to restrain the deformation of the template when being matched to test images.

The detection of an occurrence of a feature type within an image can be carried out directly by:

d) forming a representation image in which only those portions of the image which are of the feature type are enhanced;

e) thresholding the representation image to obtain an image bitmap;

f) locating areas of activity within the image bitmap; and g) determining which of the located areas of activity meet the criterion to be detected as an occurrence of the feature type.

These steps are carried out for each class and orientation of feature type that is to be used to form a template. Once all the feature types have been identified then the structural mesh of links can be formed between them.

The feature types may include, for example, oriented edge, valley and peak images which may not be ideal but which have been found to provide a useful starting set for forming templates according to the present invention.

The chosen feature types can be identified by any appropriate means. For example, the edge images may be found by using simple oriented Sobel filters and the peak and valley images derived using orientation-sensitive morphological filters. Preferably to remove any overlap of responses between feature types of a given class of feature (eg edges or valleys) but of different orientations, only the maximum valued picture elements across all orientations are retained; the corresponding picture elements at all other orientations are set to 0. It is possible in this way to obtain a set of representation images for each orientation of each feature type.

The criterion that a feature type is to be regarded as occurring in an image is conveniently that the number of picture elements in an area of activity is greater than a threshold size. Those areas that are smaller are discarded, only the remainder being used to form the nodes of the structural mesh of the template.

The feature position of an occurrence of a feature type is preferably regarded as being the centroid of the corresponding area of image activity, or blob, in the modified image bitmap.

The present invention is not restricted to any particular type of structural mesh formed to interlink the feature types. One convenient structural mesh is formed by performing a known Delauney triangulation of all the feature types. The resulting triangulated mesh of feature types, or tokens, then forms the template for the object represented in the training image.

In some instances it may be preferable to delete from the template links greater than a predetermined length in order to allow greater freedom of movement of the template between areas which may not be closely linked physically.

A token associated with any feature type may include as additional attributes the size, principal orientation and aspect ratio of the activity area, for example.

It is possible to extract meaning from the final template. The template which has been derived can be displayed by individually interpreting each constituent token. As each token describes an expected image attribute, the corresponding attribute can be displayed in the appropriate position on the image and so allow the template to be viewed, as a whole, relative to it. It is then possible to assign meaning to the parts of the template by visual inspection and labelling key points of interest which need not themselves actually be coincident with any of the tokens. For example, it may be appropriate that a key point is maintained with respect to an image to which the template is being fitted, for example for a face the nominal centre position of a nose could be labelled which may not have any coincident image activity. This position could then be obtained by its context within the fit of the template to any face.

A template formed by analyzing a single training image may be particularly suited to identifying when that image re-occurs by matching the template to it. However, there are many applications where it is necessary to identify the presence of an object which has not appeared specifically in a training image. For example, if it is necessary to recognise, in general terms, the presence of an eye in an image, then a template formed from analyzing one example of an eye may not be ideally suited to this general recognition problem as the particular eye on which the template was formed may contain feature types which are not a common characteristic of eyes generally. In these circumstances it has been found beneficial to form a generalised template formed by combining templates formed from several images each being a different example of the type of object to be recognised. So, for example, a series of different eyes can be used to form a respective series of templates. These templates are then combined to form a generalised template.

A number of possible approaches to the problem of combining the templates to form a composite template have been considered by the applicant. These included a graph matching approach, for example as described by J Segan in an article entitled "Model Learning and Recognition of Non-Rigid Objects" Computer Vision and Pattern Recognition, pages 597–602, 1989; and an energy minimisation comparison technique, similar to that used in fitting templates to images, but used between templates.

However, the approach which appears to be most promising at the time of filing this application is to use a genetic algorithm. Genetic algorithms are based on the principle of natural selection and evolution found in biological systems. The Applicant has devised and applied a genetic-type algorithm to combine templates. A set of possible solutions, in this case templates, are maintained as a population which is adapted by combining the best members whilst others are discarded to generate increasingly successful templates better able to fit faces, for example.

An embodiment of the present invention will now be described, by way of example, only with reference to the accompanying drawings in which:

FIG. 1 is a photograph constituting an image of a man's head and shoulders;

FIGS. 2(a) to 2(d) are photographs of representation images obtained from the image of FIG. 1, each of which retains occurrences of a different feature type;

FIGS. 3(a) to 3(d) are photographs of image bitmaps obtained from the representations images 2(a) to 2(d), respectively;

FIGS. 4(a) to 4(d) are photographs of those areas of activity larger than a predetermined threshold size and so are regarded as occurrences of a feature type in the image bitmaps of the FIGS. 3(a) to 3(d), respectively;

FIG. 6 is a schematic diagram showing a chromosomal representation of a template for a genetically based, template combining algorithm;

FIG. 7 is a diagram of an image divided into zones for representation as a chromosome;

FIG. 8 is a representation of the information associated with each gene of the chromosome of FIG. 6;

FIG. 9 is a diagram showing a method of dividing an image into zones by a recursive method;

FIG. 10 is a graph showing the subdivision recursion tree associated with FIG. 9;

FIGS. 11 and 12 are diagrams showing how two parent chromosomes produce two child offspring chromosomes by a crossover mechanism; and FIG. 13 is a diagram showing how a chromosome can be modified by inverting a gene string.

Figure 1:
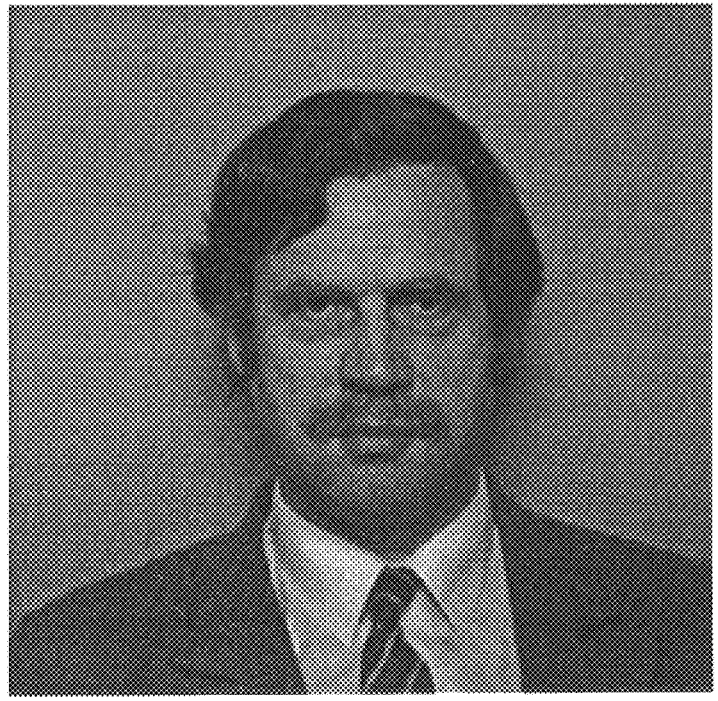

Referring first to FIG. 1 there is shown an exemplary image of a man's head and shoulders for which a method of forming a template according to the present invention will now be described. The image was captured by means of a TV camera coupled to a image storing device which stored the values of the constituent picture elements. In this particular example four feature types were considered, namely vertical and horizontal edges and edges running at 45° to the vertical. The image was therefore processed in known manner to form four representation images in which only those portions of the image of a respective feature type were retained. The resulting representation images for these features are shown in FIGS. 2(a) to 2(d).

Figure 2A:
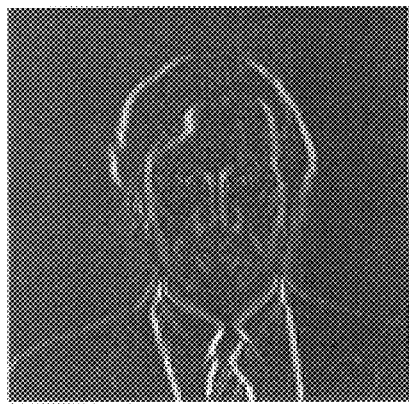
Figure 2B:
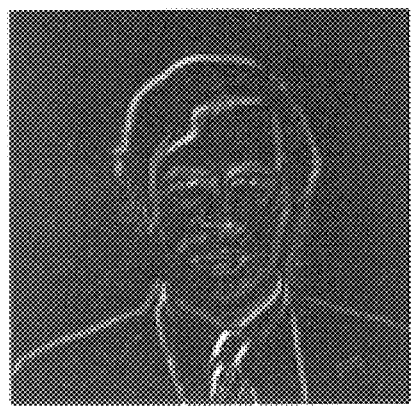
Figure 2C:
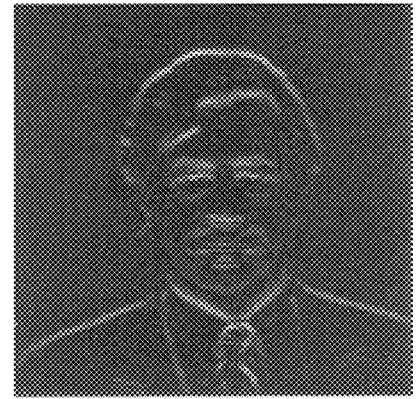
Figure 2D:
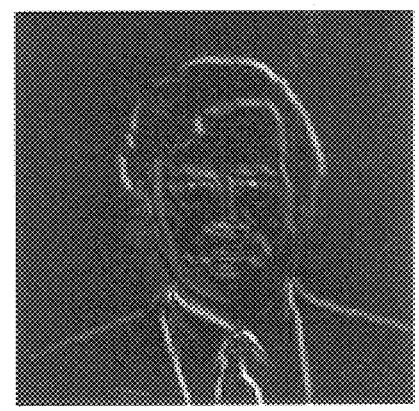

Consideration will now be restricted to the processing of the FIG. 2(a) representation image to describe how feature types were extracted from a processed representation. The same process was also applied to the other three representation images of FIGS. 2(b) to 2(d).

Figure 3A:
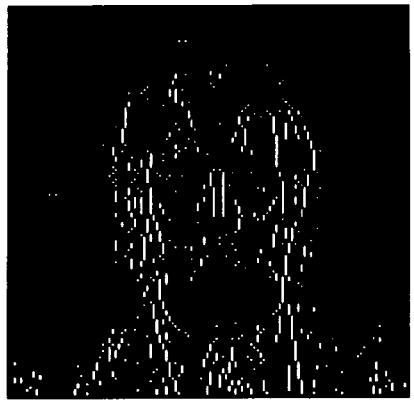
Figure 3B:
Figure 3C:
Figure 3D:

First, the representation image of FIG. 2(a) was thresholded to obtain an image bitmap as illustrated in FIG. 3(a) which retained only those portions of the image appropriate feature type. The picture elements of the image bitmaps of different orientations of a given feature type were then compared and the maximum valued picture element only retained. That is the image bitmap containing the maximum valued picture element retained that pixel whereas the equivalent picture elements in the other image bitmaps with which it has been compared are deleted. This provides a series of image bitmaps for a given feature type without any overlap between the areas of activity for the various orientations of that feature type. The size of the individual areas of the image bitmap of FIG. 3(a) were then sized by counting the number of picture elements in the particular feature. This gave a measure of the size of the feature which was then tested against a threshold. Those which were too small were deleted from the image bitmap to obtain the modified image bitmap of FIG. 4(a).

Figure 4A:
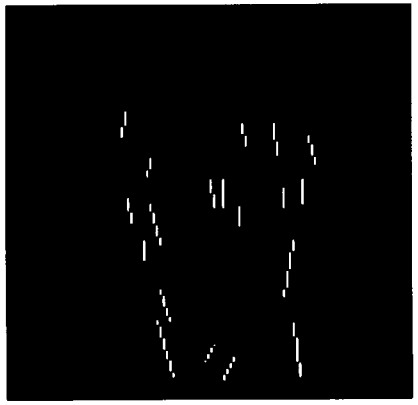
Figure 4B:
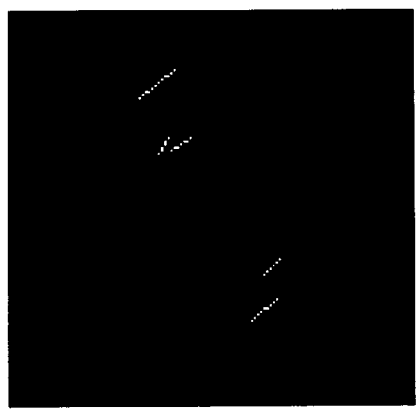
Figure 4C:
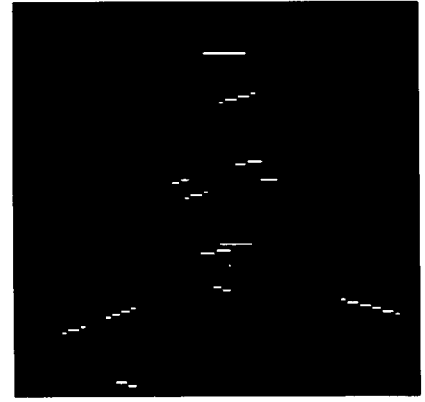
Figure 4D:
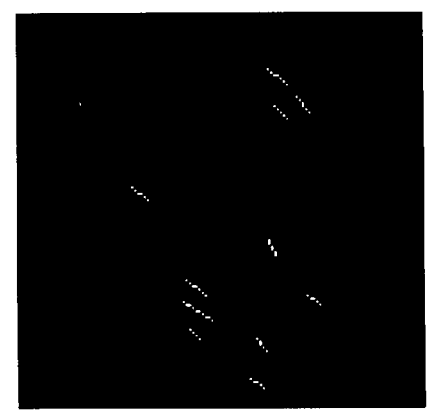

The areas of activity that remained in the modified image bitmap of FIG. 4(a) were then detected as an occurrence of the feature type, all the other instances being ignored. The feature position was calculated by weight averaging the picture element constituents of the feature, ie the centroid of the feature, which position was considered to be the point of the image at which the feature was located. Associated with this feature was a token which represented the feature type and its position within the image.

Any attributes that may be of interest according to the particular application to which the template is going to be put could also form part of the token. For example, it could contain information about the size of the feature and its strength.

The result of this processing was a series of tokens which characterised the feature type content of the original image. In a similar fashion a set of tokens was obtained for the other feature type that were to be used in forming the final template. The full set of tokens for all the feature types was then constructed which set formed the basis of a template of the original image obtained by triangulating the feature type positions.

Figure 5:
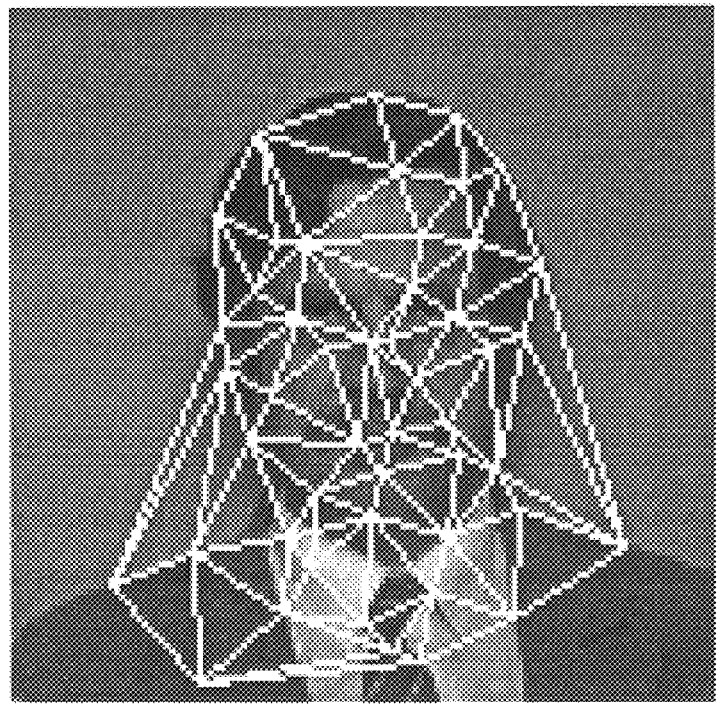
FIG. 5 is a photograph of a template formed from the feature types of FIGS. 4(a) to 4(d) shown superimposed on the image of FIG. 1 from which the template was derived.

Referring now to FIG. 5 there is illustrated a template constructed by forming a structural mesh of links between the feature positions of all the tokenised feature types of FIGS. 4(a) to 4(d). In this case the mesh was formed by connecting the feature positions with a triangulated mesh using Delauney triangulation of all the feature positions. The template so formed was the desired template representation of the original image.

The photograph at FIG. 5 shows the template superimposed on the original image with the feature positions being denoted by node positions which are linked by straight line segments.

The choice of which feature types are to be used in the formation of a template is not fixed. The set selected should, however, be chosen so that its members are distinct, informative in the sense of picking out key object details, and as independent of changes in illumination as possible. An article entitled "Pre-Attentive Processing in Vision" by Anne Treisman, in Computer Vision, Graphics, and Image Processing vol. 31, 156–177 (1985) defines a possible set of such feature types.

In general, the different processed images will not be shown visually on a visual display unit during processing of an image to form a template, rather the steps of the invention will utilise stored representations of the training image and its processed forms.

A template according to the present invention can be used to both recognise and describe the shape of novel instances of the object type upon which it has been trained by initialising it in the vicinity of an object in an image and allowing template feature types to be attracted to corresponding characteristics in the target image whilst at the same time deforming its geometric shape within limits according to how closely image detail can be matched. This fitting process is analogous to that used by traditional deformable templates of the type described by Yuille et al, referenced above. If a template is to be suitable for fitting and so describes the shape of the majority of novel instances of a given object which may be subsequently encountered then it has been found by the Applicant to be greatly beneficial that templates are formed from more than one image of different members of the class of object which is to be recognised and combining the templates to form a generalised template. This scheme, which also constitutes an aspect of the present invention, provides a generalised template which incorporates the salient features appropriate to the class of object rather than the specific features for a particular member of the class. This provides a template which is more suitable for classifying objects as opposed to identifying a particular member of a class of objects where a template solely based on that one image will be preferable.

There will now be described a particular method of combining templates to form such a generalised template according to the present invention.

The method of forming a generalised template presently preferred by the Applicant is to use a genetic algorithm to determine which of the template features are most valuable in recognising an object in the class on which it is trained. The basic algorithm requires a genetic representation analogous to the chromosomes in living creatures, a way of interpreting this representation to form a population member and a method of establishing the fitness of each population member.

The algorithm itself starts with an initial, possibly poor or unfit, population and iteratively improves the fitness by preferentially selecting fit members to be the parents of the next generation's members. Fitter members thus tend to contribute preferentially to the gene pool of the next generation, and it can be shown that genes which contribute to the above average fitness tend to increase exponentially in frequency from generation to generation.

The power of genetic algorithms does not lie merely in the survival of the fittest strategy but also in the way in which the two population members are combined. The chromosomes from any two parents should both contribute to the chromosome of their children (usually two are produced) by means of crossover. This is a phenomenon observed in animal genetics in which two chromosomes align with one another and contiguous strands of genetic material are exchanged. Thus new combinations of genes from fitter population members are constantly being tried together to obtain an overall fitness improvement.

In the context of the present invention, the set of templates to be combined should be based on a set of training images which are representative of objects that are likely to be encountered in the future. In particular, the set of image characteristics described by the derived templates should contain all the relevant elements to describe the appearance of most new objects likely to be presented to an image recognising apparatus.

The genetic algorithm is then applied to swap elements between chromosomes from generation to generation which has the effect of producing new chromosomes representing templates which contain new mixtures of element taken from various different initial templates. A part of a template good at matching for example eyes in one template may be co-joined with a part of another template good at matching a mouth thereby producing a composite template good at doing both tasks.

The details of an implementation of such a genetic algorithm will now be described in more detail.

Each template that is going to contribute to the composite template must be encoded as a chromosomal representation for the genetic algorithm to operate upon.

As well as a chromosomal representation of a template there must also be a method of interpreting chromosomes in order to derive the corresponding template individual. In the context of the present invention one must also be able to create a chromosome given the template description in order to initialise the starting population given the training set of derived templates.

There are certain properties that it is desirable a chromosome representation exhibits due to constraints laid down by genetic algorithms in general as well as practical considerations. It is preferable to have a fixed length chromosome description consisting of a fixed number of gene units as this helps during mating and crossover of chromosomes. Collections of genes which provide advantageous attributes in individuals are said to be co-adapted, that is they work well together. It is preferable that such co-adapted genes congregate locally on the chromosome such that they tend to be preserved during crossover. Each gene should preferably represent an element from an alphabet of low order, ie it should only be able to take on a small range of values.

The chromosomes described to date in the scientific literature consist of linear strings of genes. Although a 2-D chromosomal representation may seem to be closer to the 2-D nature of the templates, the present embodiment uses the more traditional linear mapping of genes for which the theory is now reasonably well developed albeit in other applications. Alternative chromosome representation strategies may, of course, be adopted if they prove to be advantageous. The linear structure of the genes within a chromosome should not present any problems, however, since during initialisation the feature types which are in close proximity spatially are represented by genes close together on the chromosome. The property exhibited by genetic algorithms is to provide clustering of co-adapted genes on the chromosome which should help to prevent such clusters from being broken up during crossover.

Referring now to FIG. 6 a chromosome representation of a template used comprised a set of n genes $G_i$, i=0 to n−1, each gene $G_i$ representing the feature type in one area of the image. In order to fix the length of the chromosome the image area was quantised into a fixed number of zones (square regions) $Z_i$ as shown in FIG. 7. Each zone $Z_i$ could contain one or more instances of the recognisable feature types but only one was coded in the chromosome.

FIG. 8 shows the information encoded by a gene $G_i$ of a chromosome. It consisted of three gene fields, $F_1$, $F_2$ and $F_3$. Gene field $F_1$ contained the number of the zone $Z_i$ which it encodes—in this case zone number 34. Gene field $F_2$ contained a flag indicating whether the feature type within that zone is active. Gene field $F_3$ denoted the feature type—in this case a top right to bottom left, 45° edge.

Since the genes $G_i$ contained a reference to the zone $Z_i$ of the image to which they corresponded the zone number $Z_i$ and the position of a gene on a chromosome were therefore independent so they could change their relative chromosome location freely, as desired. The genes were restricted to elements from a relatively low order alphabet consisting of the number of allowable feature types.

As stated above, the zone $Z_i$ to which a gene $G_i$ corresponded was indicated by a zone number. The actual zone details such as zone position and adjacency information were held in a separate location in order to minimise the extraneous detail which had to be coded by each gene. A compact representation is more efficient which was important during implementation of the algorithm.

The connectivity of the feature types within the template structural mesh was not encoded at all within the genetic representation but was created automatically during expression of the chromosome to produce the corresponding template as will be described below.

Although genetic algorithms are often initialised randomly and then allowed to search for a solution, it is preferable to initialise the population from a set of base templates derived from a set of training images of the object of interest. It should be noted that these images were very crudely normalised such that the centres of the eye and mouth in each image also align across all the images in order to assist the genetic algorithm in combining templates during later stages.

The first stage of initialisation was to convert the base templates into their equivalent chromosome representations. This consisted of determining within which zone each template feature type lay and then assigning a gene for that feature type. When more than one 9 feature type falls within a single zone, an arbitrary one was kept the rest being discarded. The only remaining variable in the initialisation was the ordering of the genes on the chromosome. Since it was not known at initialisation which feature types were related, and hence which genes were co-adapted, the optimal ordering of genes was not known. However, a strategy was adopted which located genes containing spatially close tokens in similar proximity on the chromosome as it had been found that local feature types are often related to one another.

The strategy used in the present embodiment to decide which genes go where on the chromosome consisted of a recursive spatial subdivision process applied to the space of the entire image.

Referring to FIGS. 9 and 10, a full image 62 was recursively split once, evenly, into four sub-regions $S_1$ to $S_4$ about the midpoint of the image, which sub-regions were then randomly ordered and split again until the sub-regions $S_{ijk}$ reached the specified zone size. Each time the recursion reached a minimum sized zone sub-region the corresponding gene was added onto the end of the growing list of genes on the chromosome. Spatially proximate zones were generally close in the recursion tree and so mapped onto nearby genes.

Although there is no perfect mapping from 2-D to 1-D which preserves locality, this process provided orderings which exhibited a high degree of locality whilst introducing some variability into the ordering as between the different initial chromosomes.

The chromosomal description of an individual is known as the genotype and this can be expressed or interpreted to form the individual itself known as the phenotype. It is necessary to be able to express the chromosome in terms of the phenotype before one can go on to evaluate the fitness of the given individual. The phenotype consists of a template in the present instance.

The process of expressing the chromosome was relatively straightforward in the present case. Each gene $G_i$ of the chromosome was examined and if marked as active a corresponding feature type was created in the generalised template structure of the type specified by the field $F_3$ of the gene $G_i$. The gene $G_i$ also implicitly codes the position of the feature type in terms of the zone index which could be cross referenced to the list of zone details to provide the feature position information.

The template nodes had to be triangulated as previously described to form the template and for fitting to a given test image. The triangulation was performed as a post-processing stage just prior to fitting the template. No node connectivity information was encoded within the genetic representation itself.

In order that the mechanism of selection could proceed it was necessary to have a means of evaluating a measure of merit or fitness for a given template offspring arising out of the combination of two template chromosomes. The individual template was first obtained from the corresponding chromosomal representation as described above. It then had to be evaluated for fitness.

It is first necessary to define what is meant by a good template for a given image of an object. The basic requirement is that the template should achieve a good match to the image data of a given test image as well as achieving a geometric fit with small deformation. The fitting process used to test the fitness of a given template will correspond to the fitting process to be used on the final composite template when matching test images.

Given the above requirements it can be seen that a trivial solution for obtaining a maximal fit and image response is a template which saturates a test image with all possible, feature types to be matched. Since it is also required that a template description is as concise as possible, that is without an instances excess of feature types, a cost is associated with the template which increases with increasing numbers of occurrences of feature types and so prevents oversaturation of template nodes.

Bringing these elements together one can formulate an objective measure of merit for a given template applied to a given test image where greater values indicate more desirable templates subject to our criteria. The merit equation used in this embodiment was the merit value G given by:

$$G = k_1 \sum_{i=1}^{n} I_{t_i}(\vec{x}) - k_3 \left(\frac{n}{N}\right)^p - \frac{k_2}{num\_edges} \sum_{i,j \in edges} \left| \frac{l_{ij}}{g_s} - l_{Oij} \right|$$

where the variables are:

| | |
|---|---|
| G | unnormalised number of merit |
| n | number of nodes |
| N | desirable number of nodes |
| $I_t$ | image response representation types t |
| $t_i$ | type of node i |
| $x_i$ | position of feature type i |
| num_edges | number of inter-node connections |
| $l_{ij}$ | current distance between connected nodes |
| $L_{oij}$ | original distance between connected nodes |
| $G_s$ | Global mesh scale |
| p | excessive node penalty constant |
| $k_i$ | empirical determined weighting factors |

The final template had to work well for most of the novel faces likely to be encountered so it was necessary to assess the template's merit measure against a range of faces. An environment of face images was therefore used which is separate from the initial training set. To evaluate each member of the population at a given generation a sample of test face images was randomly picked from the environment set. Each individual template was then fitted to each of the test set of images using a small number of iterations on the above measure of merit and a single average merit value calculated per template. These values formed the final unnormalised measures of merit for each template.

The merit value G described above includes both negative and positive values. It is necessary to form a measure of fitness for use by the genetic algorithm which is both non-negative and exhibits an even spread of values across the population during any given generation so the better members can be effectively discriminated for. The measure G was normalised to achieve these criteria and yield a fitness value that was useable.

There are several possibilities for the normalisation of the objective merit measure to form a more useful fitness measure. Normalisation was performed such that an average performing member of the population received a fitness of unity, with better members having greater fitness values and worse members having lesser but always non-negative fitness values. A possible normalisation scheme is to calculate the normalised fitness f using the equation.

$$f = 1 + \frac{(G - \mu)}{(k \cdot \sigma)}$$

where the mean $\mu$ and standard deviations $\sigma$ of the values G across the population are first calculated and then the normalised fitness is calculated for each population member. "k" is a small constant, typically less than 3, which governs the spread of resulting fitness values. In a few instances where the resulting fitness f will be negative, it is set to 0.

Genetic algorithms select members from the existing population to breed and produce the next generation. This selection is performed in a probabilistic fashion depending on the relative fitness of each member. The actual method used in this embodiment was stochastic remainder selection which has been found to perform better than purely random procedures. This method guarantees that the better than average members will be appropriately represented in the succeeding generation by deterministically assigning part of the breeding population prior to random selection of the remainder of the breeding population.

Crossover is the most powerful of the genetic operators employed in this genetic algorithm and will now be explained with references to FIGS. 11 and 12. Crossover provides the means for useful attributes of one individual to combine with other useful attributes from a second individual to produce a child which hopefully exhibits the strengths of both. Many combinations are tried together with poor combinations being weeded out by fitness selection. Crossover was applied with a high probability of about 0.6.

To effect crossover, two cut points 70 and 71 were randomly chosen using a uniform probability distribution over the length of two chromosomes $G^A$ and $G^B$ having gene strings $G^A_1$ to $G^A_0$ and $G^B_1$ to $G^B_n$, respectively. The cut points 70 and 71 define two regions of the parent chromosomes $G^A_0$ to $G^A_O$ and $G^B_c$ to $G^B_d$, respectively. These were exchanged to create two children chromosomes $G^C$ and $G^D$ as shown in FIG. 12.

There was a minor problem which had to be resolved to maintain the integrity of both child chromosomes. It would often happen that the set of zones represented by the incoming genes for one child would not match those coded for by the outgoing genes as the gene sequences varied. In such a case some zones will be multiply represented and others completely unrepresented. This was remedied by matching surplus genes in the first child $G^C$ outside the crossover region with surplus genes in the second child $G^D$ also outside the crossover region and exchanging these between the two strings. In this way both children $G^C$, $G^D$ ended up with a full complement of genes representing all the possible tokens zone position as we require. The integrity of the sequence of genes in the crossover region was always maintained. This type of approach had been successfully applied previously to similar problems where gene ordering can vary such as genetic algorithms applied to the travelling salesman problem.

A further technique employed in the genetic algorithm of the present invention was mutation, a genetic operator which acts on a single gene to randomly change it in some way. The mutation operation was applied with a very low probability as a background operator to the algorithm as a whole, its function being to reintroduce genetic variation which may have been lost, or new useful variations. The principal mechanisms of this genetic algorithm is the combination of the crossover operator and the survival of the fittest selection.

As mutations occur relatively infrequently we adopted the following strategy rather than keep checking to see whether a mutation will occur for every gene: we decide in advance which genes will mutate. Assuming probability p of single gene mutating, the cumulative probability c of a single mutation in a gene string is given by:

$c=1-(1-p)n$

It was therefore possible to randomly select a cumulative probability c in the range (0, 1) and calculate the next gene to mutate as being the gene n gene-positions ahead in the gene string. The value of n was calculated by rearranging the above equation to give:

$n=log(1-c/log(1-p))$

When the mutation occurred within a gene in the model, the activity of the gene and hence the corresponding token was toggled. If the gene was active and so contained a token it was marked inactive, otherwise it was marked active and the corresponding feature type field $F_3$ assigned a random feature type from those allowable. As there was a gene for every zone within an image, a feature type could, potentially, have become active with any zone $Z_i$ at any of the available image locations.

The inversion operator was a further type of mutation operator also included in the algorithm of the present invention which operated at a fairly low probability. It operates on a single chromosome and its affect is to completely invert the sequence order of a randomly chosen string of genes on the chromosome as shown in FIG. 13.

The gene string of a chromosome $G^B$ to be inverted is chosen by randomly selecting two end points 72, 73 based on the uniform probability function over the entire length of the chromosome. This gene string is then reversed in order within the chromosome $G^B$ to form a new chromosome $G^F$.

It is to be noted that inversion does not affect the template corresponding to the chromosome during the current generation as the same tokens are coded regardless of the gene order. The main effect of inversion is to allow genes to change position on the chromosome such that co-adapted genes tend to become clustered over time. Such clusters of genes will tend to be preserved during crossover as the cut point is less likely to fall between co-adapted genes if they are physically close on the chromosome. As an example, genes coding for feature types good at matching an eye may cluster and then usefully propagate through the population and eventually be combined with a smaller co-adapted gene cluster relevant to matching a mouth to thereby improve the template as a whole.

The algorithm described above was carried out on a Meiko transputer array consisting of an array of 64 individual transputer based processing nodes and some special nodes consisting of graphics display cards. The actual implementation of the algorithm described above is arbitrary to the extent that it only affects the time taken to compute the generalised template from the set of individual templates.

We claim:

1. A method of forming a template of an image of an object comprising steps of:
    a) detecting occurrences of at least one feature type within the image which meet a repective criterion;
    b) for each such occurrence, determining a feature position which is a point within the image at which the occurrence of the feature type is to be considered as being located; and
    c) constructing a structural mesh of links between the feature positions.

2. A method as claimed in claim 1 in which step a includes, in respect of each feature type the steps of:
    d) forming a representation image in which only those portions of the image which are of the feature type are enhanced;
    e) thresholding the representation image to obtain an image bitmap;
    f) locating areas of activity within the image bitmap; and
    g) determining which of the located areas of activity meet the criterion to be detected as an occurrence of the feature type.

3. A method as claimed in claim 2 in which the step of locating areas of activity within an image bit map includes comparing the corresponding picture elements of the image bit maps of different orientations of a given feature type and retaining only the maximum valued picture elements.

4. A method as claimed in claim 2 in which the criterion is that the area of activity must be greater than a threshold size.

5. A method as claimed in claim 2 in which the feature position is the centroid of the corresponding area of activity in a modified image bitmap.

6. A method as claimed in claim 1 in which a structural mesh is constructed by Delauney triangulation.

7. A method as claimed in claim 1 in which the template is modified by deleting lengths greater than a predetermined length.

8. A method as claimed in claim 1 in which the feature types are selected from a set of feature type which includes oriented edges, oriented peaks and oriented valleys.

9. A method of forming a template comprising deriving a plurality of templates forming respective images of different members of the class of objects according to claim 1 and combining the templates to form a generalised template.

10. A method as claimed in claim 9 in which the templates are combined using a genetic algorithm.

* * * * *